United States Patent

Carrubba et al.

Patent Number: 5,338,458
Date of Patent: Aug. 16, 1994

[54] METHOD FOR REMOVING CHLORAMINE WITH CATALYTIC CARBON

[75] Inventors: Robert V. Carrubba; Richerd A Hayden; Thomas M. Matviya, all of Pittsburgh, Pa.

[73] Assignee: Calgon Carbon Corporation, Pittsburgh, Pa.

[21] Appl. No.: 7,146

[22] Filed: Jan. 21, 1993

[51] Int. Cl.$^5$ .............................................. C02F 1/28
[52] U.S. Cl. ................................................ 210/668
[58] Field of Search ........................ 210/660, 668, 763

[56] References Cited

U.S. PATENT DOCUMENTS

| | | | |
|---|---|---|---|
| 3,733,266 | 5/1973 | Bishop et al. | 210/754 |
| 3,909,449 | 9/1975 | Nagai et al. | 252/422 |
| 4,624,937 | 11/1986 | Chau et al. | 502/180 |

FOREIGN PATENT DOCUMENTS

| | | |
|---|---|---|
| 3620425 | 6/1987 | Fed. Rep. of Germany . |
| 4031968A1 | 4/1992 | Fed. Rep. of Germany . |
| 0158331 | 4/1989 | Japan . |

OTHER PUBLICATIONS

J. Wang and W. Xie, "An Appraisal of the Surface Chemistry and the Catalytic Oxidative Activity of Nitrogen-Modified Activated Carbon by XPS, " *Cuihua Xuebao 10 (4)*, 357 (1989).

H. P. Boehm, A. R. de Rincon, T. Stohr, B. Tereczki, and A. Vass, "Activation of Carbon Catalysts for Oxidation Reactions by Treatment with Ammonia or Hydrogen Cyanide, and Possible Causes for the Loss of Activity During Catalytic Action," *Journal de Chemie Physique 84*, 449 (1987).

Y. Komatsubara, S. Ida, H. Fujitsu, and I. Mochida, "Catalytic Activity of PAN-Based Active Carbon Fibre (PAN-ACF) Activated with Sulphuric Acid for Reduction of Nitric Oxide with Ammonia," *Fuel 63*, 1738 (1984).

L. Singoredjo, F. Kapteijn, J. A. Moulijn, and J. M. Martin-Martinez, "Modified Activated Carbon for Low Temperature Selective Catalytic Reduction of NO with NH3," *20th Bien, Conf. on Carbon*, Jun. 23–28, 1991, p. 78.

W. Farmer and J. B. Firth, "The Catalytic Activity of Carbons from Aromatic Hydrocarbons and Some Derivatives," *J. Phys. Chem. 28*, 1136 (1924).

P. F. Bente and J. H. Walton, "The Catalytic Activity of Activated Nitrogenous Carbons," *J. Phys. Chem. 47*, 133 (1943).

J. Watanabe and T. Shiramoto, "Activated Carbon Electrodes for Air–Depolarized Wet Cells III: The Decomposition of Hyrdogen Peroxide by Activated Charcoal," *J. Electrochem. Soc. Japan 20*, 386 (1952).

E. Naruko, "Ammonia–Activated Charcoal," *Kogyo Kagaku Zasshi 62(12)*, 2023 (1964).

I. Mochida, Y. Masumura, T. Hirayama, H. Fujitsu, S. Kawano, and K. Gotoh, "Removal of SO2 in Flue Gas by Polyacrylonitrile Based Active Carbon Fiber (PA-N-ACF)," *Nippon Kagaku Kaishi N4*, 269 (1991).

A. Nishijima, H. Hagiwara, M. Kurita, A. Ueno, T. Sato, Y. Kiyosumi, and N. Todo, "Characterization of Nitrogen–Containing Active Carbon Catalysts for SO2 Removal," *Bull Chem. Soc. Japan 55*, 2618 (1982).

S. K. Naito, S. Takagi, H. Ebata, and S. Takei, "Activation of Carbon Catalysts for Oxidation of Iron (II) Ion in Sulfuric Acid Solution by Oxygen," *Nippon Kagaku Kaishi 4*, 467 (1979).

I. Gavat, C. Costea, and A. Draganescu, "Catalytic Activity of Pyrolized Urea–Formaldehyde Polymers and of Some Melamine and Benzoguanamine Condensation Polymers with Substances Containing CO Groups," *Revue Roumaine de Chimie 12*, 1127 (1967).

(List continued on next page.)

Primary Examiner—Ivars Cintins
Attorney, Agent, or Firm—Cindrich & Titus

[57] ABSTRACT

An improved process is provided for the removal of chloramines from gas or liquid media by contacting said media with a catalytically-active carbonaceous char. The improvement is provided by the use of a carbonaceous char capable of rapidly decomposing hydrogen peroxide in aqueous solutions.

6 Claims, 2 Drawing Sheets

COMPARISON OF CHLORAMINE REMOVAL AND t-3/4 TIME

| SAMPLE NUMBER | APPARENT DENSITY (g/cc) | CARBON TETRACHLORIDE NUMBER (%) | t-3/4 TIME (minutes) | CHLORAMINE REMOVED FROM SOLUTION (%) |
|---|---|---|---|---|
| 1 | 0.483 | 54.8 | 2.4 | 75 |
| 2 | 0.480 | 60.4 | 4.6 | 48 |
| 3 | 0.503 | 54.0 | 9.4 | 40 |
| 4 | 0.499 | 58.3 | 23.4 | 35 |
| 5 | 0.511 | 54.8 | 54.4 | 35 |
| 6 | 0.497 | 60.4 | 80.2 | 33 |

OTHER PUBLICATIONS

K. Boki, S. Tanada, and T. Miyoshi, "Removal by Adsorption of Hydrogen Sulfide by a New Type of Activated Carbon Containing Nitrogen," *Nippon Eiseigaku Zasshi 38(5)*, 877 (1983).

H. Sano and H. Ogawa, "Preparation and Application of N-Introduced Carbon II: Application for Removal of Sulfur Oxides from Flue Gas," *Osako Kogy Gijutsu Shikenjo Koho 26*, 92 (1975).

K. Boki, S. Tanada, T. Kita, T. Nakamura, H. Takahashi, and R. Hamada, "Increase in Micropore Volume of N-Containing Activated Carbon Treated with Methylol Melamine Urea Solution," *Experientia 39*, 143 (1983).

S. Tanada, T. Kita, K. Boki, and Y. Kozaki, "Preparation of Narrow Pores Carbon Suitable for Hydrogen Sulfide Asorption," *J. Environ. Sci. Health A20 (1)*, 87 (1985).

B. Stohr, H. P. Boehm, and R. Schlogl, "Enhancement of the Catalytic Activity of Activated Carbons in Oxidation Reactions by Thermal Treatment with Ammonia or Hydrogen Cyanide and Observation of Superoxide Species as a Possible Intermediate," *Carbon 29(6)*, 707 (1991).

M. Zuckmantel, R. Kurth, and H. P. Boehm, "Carbons as Catalytic Agents for the Oxidation of Sulfurous Acid," *Z. Naturforsch. 34b*, 188 (1979).

Y. Maki, "Relation Between Performances of the Air-depolarized Cell and Catalytic Activity of Charcoals," *J. Electrochem, Soc. Japan (Overseas Ed.)*, 27, No. 4-6 E 115 (1959).

R. Manoharan, A. K. Shukla, "Oxygen-Reducing Porous Carbon Electrode for Electrochemical Power Sources with Alakline Electrolytes," *Journal of Power Sources*, 10 (1983) 333-341.

D. M. Drazic and R. R. Adzic, "Influence of Surface Treatment of Active Carbon on Its Activity in Fuel Cell Electrodes," *Flasnik Hemijskog Drustva Beograd*, 349(2-4) 203(10) (1969) CA 73(26):136627.

COMPARISON OF CHLORAMINE REMOVAL AND t-3/4 TIME

| SAMPLE NUMBER | APPARENT DENSITY (g/cc) | CARBON TETRACHLORIDE NUMBER (%) | t-3/4 TIME (minutes) | CHLORAMINE REMOVED FROM SOLUTION (%) |
|---|---|---|---|---|
| 1 | 0.483 | 54.8 | 2.4 | 75 |
| 2 | 0.480 | 60.4 | 4.6 | 48 |
| 3 | 0.503 | 54.0 | 9.4 | 40 |
| 4 | 0.499 | 58.3 | 23.4 | 35 |
| 5 | 0.511 | 54.8 | 54.4 | 35 |
| 6 | 0.497 | 60.4 | 80.2 | 33 |

FIG. 2

METHOD FOR REMOVING CHLORAMINE WITH CATALYTIC CARBON

FIELD OF THE INVENTION

The present invention relates to the use of a catalytically active carbonaceous char for the removal of chloramines from gas or liquid streams.

BACKGROUND OF THE INVENTION

Chloramines in low concentrations arise from the disinfection of drinking water sources. To improve the taste and odor of the water and to remove the inherently toxic chloramines, the water is typically contacted with activated carbon. The ability of carbonaceous materials, such as activated carbon, to remove chloramines from aqueous streams is generally well known. It is also known that improvements in monochloramine removal can be achieved by reducing the mean particle diameter of the carbon and increasing the empty bed contact time. In some applications, such as in kidney dialysis units, high rates of monochloramine removal are particularly important. Although parameters such as contact time and mean particle diameter are known to affect chloramine removal efficiencies, removal performance is not well understood nor particularly effective.

Accordingly, it is the object of the present invention to provide a method of enhanced chloramine removal. It is a further object of the invention to provide a carbonaceous char which is intrinsically catalytically active for chloramine removal apart from factors such as contact time, mean particle diameter, and the like which are known to affect chloramine removal.

SUMMARY OF THE INVENTION

Generally, the present invention comprises a method for removing chloramines from aqueous media by contacting said media with a catalytically-active carbonaceous char which is characterized by its ability to rapidly decompose hydrogen peroxide in aqueous solutions. Prior art carbon materials which have been used for this application in the past do not rapidly decompose hydrogen peroxide in aqueous solutions. The carbonaceous chars used in the present invention may be prepared from carbon materials which have been contacted or otherwise exposed to nitrogen-containing compounds at temperatures above 700 C. and are characterized by an ability to rapidly decompose hydrogen peroxide in aqueous solutions.

The carbonaceous feedstocks from which such carbons are produced may be either nitrogen-poor naturally-occurring materials such as coals or nitrogen-rich processed feedstocks such polyacrylonitrile. The nitrogen-rich feedstocks are carbonized or carbonized and oxidized prior to activation at high temperatures with a gasifying agent such as steam or carbon dioxide. The nitrogen-poor feedstocks may be processed as low-temperature carbonized chars or as high-temperature carbonized chars such as activated carbons. Either carbon may be oxidized prior to, during, or after carbonization. However, all nitrogen-poor chars must be contacted or otherwise exposed to nitrogen-containing compounds such as ammonia, urea or the like at high temperatures prior to, during, or after calcination and/or activation at high temperatures with a gasifying agent such as steam or carbon dioxide. Additionally, it is essential that the final products in all cases described above be cooled to temperatures below 400 C., preferably 200 C., in an oxygen-free or otherwise inert atmosphere.

The catalytically-active carbonaceous chars of the present invention are distinguished from prior art carbons by their ability to rapidly decompose hydrogen peroxide in aqueous solutions. When tested under nearly equivalent conditions of contact time, mean particle diameter, pore volume, pore size distribution, and the like, these catalytically-active carbonaceous chars remove chloramines much more effectively than prior art carbon materials which have been used for this application in the past. Other advantages of the present invention will become apparent from a perusal of the detailed description of the presently preferred embodiments.

BRIEF DESCRIPTION OF THE DRAWINGS

FIG. 1 is a diagrammatic view of a representative apparatus for measuring the catalytic activity of carbonaceous char and FIG. 2 is a table showing a comparison of chloramine removal and $t-\frac{3}{4}$ time.

PRESENTLY PREFERRED EMBODIMENTS

Figure 1:
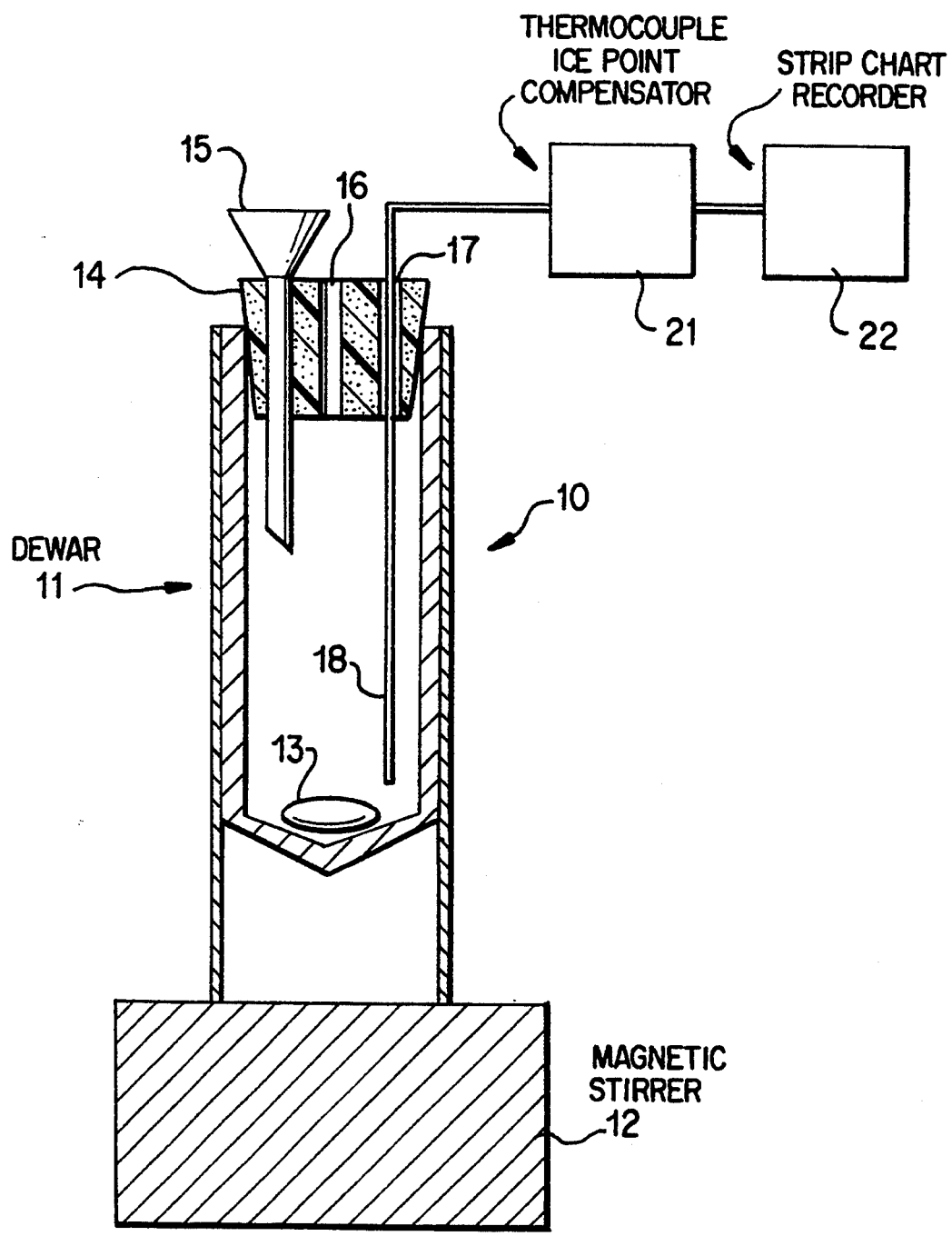

Six samples of carbonaceous chars were selected to illustrate the present invention. These chars were all sized to approximately less than 4 and greater than 6 mesh size ( U.S. Standard Series Sieves). These chars were selected such that their Apparent Densities (Test Method Number TM-7, Calgon Carbon Corporation, Pittsburgh, Pa.) and Carbon Tetrachloride Numbers (Test Method Number TM-6, Calgon Carbon Corporation, Pittsburgh, Pa.) were nearly equivalent, which indicates that their pore volumes were also nearly equivalent. Although the pore volumes of these six samples were nearly equivalent, their abilities to catalytically decompose hydrogen peroxide in aqueous solutions were very different. These differences were quantified by use of the $t-\frac{3}{4}$ test method set forth in U.S. patent application Ser. No. 08/006,470; filed Jan. 21, 1993 by the assignee of the present invention and incorporated herein by reference.

This test measures the time required for the catalytically-active carbonaceous char to decompose three fourths of the available hydrogen peroxide, and this time is referred to as the $t-\frac{3}{4}$ time. In particular, the test measures the elapsed time required for 0.250 grams of carbon to decompose 75% of a standard amount of aqueous hydrogen peroxide (0.42 moles $H_2O_2$) as indicated by the temperature rise of the system. The time required for decomposition is determined by measuring the temperature of the reaction mixture using an accelerating rate calorimetric method. The test results are set forth in units of minutes. With reference to FIG. 1, an apparatus 10 is shown which is useful in conducting the tests of the present invention. Apparatus 10 includes a Dewar 11 (Catalog Number 10-195 A, Fisher Scientific, Pittsburgh, Pa., or equivalent) positioned on a magnetic stirrer 12 (Model PC-351, Corning Hot Plate Stirrer, Corning Scientific Products, Corning, N.Y., or Model 18425 Nuova II Stir Plate, Thermolyne Corporation, Dubuque Iowa, or equivalent) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22. In practice, the carbonaceous char to be tested is first pulverized such that greater than 90% of the material would pass through a 325 mesh U.S. Standard Series sieve. The styrofoam cap 14 of dewar 11 is removed and a 0.250 gram portion of this pulverized material is placed therein. Deionized water (100 mL) is then added to the Dewar. The addition of this water is performed in such a manner that any pulverized carbonaceous char clinging to the sides of Dewar 11 is carried into the main body of the water in the bottom. Next, a 50 mL aliquot of aqueous buffer solution is added to the Dewar. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about $\frac{1}{8}$" deep is formed in the mixture and the optimum stirring speed is achieved. The optimum stirring speed is selected such that additional increases in stirring speed do not significantly affect the peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stirrer (12). Optionally, Dewar 11 can be replaced with an equivalent unit that, due to manufacturing variances, positions the stir bar farther into the magnetic field of the stirrer 12. If the stir bar still does not adequately couple with the magnetic field of the stirrer 12, the Dewar can be shortened by removing some of the bottom portion of the outside metal casing. Styrofoam cap 14 is now replaced, and thermocouple 18 ( Type K or J, 1/16" diameter, Inconel sheathed, ungrounded or equivalent) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn. or equivalent) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar through the funnel 15 in the styrofoam cap. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40 C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the catalytically active carbonaceous char to decompose three-fourths of the available hydrogen peroxide and is referred to as the $t-\frac{3}{4}$ time. This value is reported in units of minutes. The $t-\frac{3}{4}$ time determined for each of the six carbon samples are listed in Table 1 along with the Carbon Tetrachloride Number and Apparent Density of each sample. The lower the $t-\frac{3}{4}$ time, the higher is the level of catalytic activity. Typical values of the $t-\frac{3}{4}$ time for commercial activated carbons are in excess of 30 minutes.

The ability of each of the carbonaceous chars to catalytically decompose chloramine in aqueous solution was determined in the following manner. The carbon to be tested is first pulverized such that greater than 90% of the material would pass through a 325 mesh U.S. Standard Series sieve. A stock monochloramine solution is then prepared by combining equal volumes of a 1.5 g/L $NH_4Cl$ solution and a 1.25 g/L $Na_2CO_3$ solution containing 12.5 mL/L of Chlorox household bleach. This monochloramine solution contains approximately 350 ppm $NH_2Cl$ as $Cl_2$. If the assay of this stock solution shows the monochloramine concentration to be low, it may be increased if desired by the addition of small portions of Chlorox and $NH_4Cl$. A 200 mL aliquot of the stock monochloramine solution is then placed into a 250 mL Erlenmeyer screw top flask.

A 0.200 g portion of the pulverized char is next added to the flask. The flask is immediately capped and swirled to thoroughly wet the pulverized char. The capped flask is immediately placed in a covered shaker bath which is maintained at ambient temperature. The flask is agitated in the bath for a period of time such that an elapsed carbon-solution contact time of 75 minutes, as measured from the initial addition of the pulverized carbon char to the solution, is obtained. At the end of this elapsed time period the flask is removed from the shaker bath, and the mixture immediately vacuum filtered through a 0.45 micron filter pad.

The monochloramine concentration of the filtrate is then determined using a modified version of a ferrous ammonium sulfate titration described elsewhere (STANDARD METHODS FOR THE EXAMINATION OF WATER AND WASTEWATER, 16th Edition, 1985, pages 306 to 309, American Public Health Association, 1015 Fifteenth Street NW, Washington, D.C. 20005). The modification to this procedure consisted solely of the substitution of DPD Reagent Powder Pillows For Total Chlorine (Catalog Number 14076-99, HACH Company, P.O. Box 389, Loveland Colo. 80539) for the DPD indicator solution specified in the procedure. To establish the initial concentration of the stock chloramine solution, the procedure is repeated without the addition of a pulverized char to the flask. Using this procedure, the extent to which each of the six carbonaceous chars catalytically decomposed monochloramine was determined. For these determinations, the stock solution monochloramine concentration was 300 ppm. The percent of chloramine decomposed by each of the carbonaceous chars is given in the table shown in FIG. 2.

The table shown in FIG. 2 clearly shows that the extent to which a carbonaceous char catalytically decomposes hydrogen peroxide corresponds to that for the decomposition of chloramines. It has been found that carbonaceous chars having $t-\frac{3}{4}$ times of less than about 15 minutes provide significantly enhanced removal of chloramine. It is also apparent, as the Apparent Densities and Carbon Tetrachloride Numbers of these chars are nearly equivalent, that the observed effect is not significantly attributable to differences in pore volumes.

While presently preferred embodiments of the invention have been described in detail, the invention may be otherwise embodied within the scope of the appended claims.

What is claimed is:

1. The process for the removal of chloramines from solutions or streams which comprises contacting said solutions or streams with a catalytically-active carbonaceous char having a t-¾ time less than about 15 minutes.

2. A process as set forth in claim 1 wherein said carbonaceous char has a t-¾ time of less than about 5 minutes.

3. The process of claim 1 wherein the solutions or streams are aqueous.

4. The process of claim 1 wherein said catalytically-active carbonaceous char is granular, pellets, shaped, or powdered.

5. The process of claim 1 wherein said catalytically-active carbonaceous char is derived from any carbon-containing material.

6. The process of claim 1 wherein said catalytically-active carbonaceous char is activated carbon.

* * * * *